United States Patent [19]

Weingart et al.

[11] 4,260,332
[45] Apr. 7, 1981

[54] COMPOSITE SPAR STRUCTURE HAVING INTEGRAL FITTING FOR ROTATIONAL HUB MOUNTING

[75] Inventors: Oscar Weingart, Riverside; Edgar E. Morris, Covina, both of Calif.

[73] Assignee: Structural Composite Industries, Inc., Azusa, Calif.

[21] Appl. No.: 22,888

[22] Filed: Mar. 22, 1979

[51] Int. Cl.$^3$ ............................................. B64C 11/20
[52] U.S. Cl. .................................. 416/226; 416/218; 416/230
[58] Field of Search ................... 416/204 R, 218, 226, 416/230, 241 A

[56] References Cited

U.S. PATENT DOCUMENTS

| | | | |
|---|---|---|---|
| 2,182,812 | 12/1939 | Lougheed | 416/230 |
| 2,484,141 | 10/1949 | Alex | 416/230 A |
| 3,237,697 | 3/1966 | Ford et al. | 416/226 |
| 3,303,889 | 2/1967 | Bates | 416/204 |
| 3,349,157 | 10/1967 | Parsons | 416/230 A |
| 3,664,764 | 5/1972 | Davies et al. | 416/230 |
| 3,713,753 | 1/1973 | Brunsch | 416/241 A |
| 4,191,510 | 3/1980 | Teysseyre et al. | 416/218 |

*Primary Examiner*—Everette A. Powell, Jr.
*Attorney, Agent, or Firm*—Wagner & Bachand

[57] ABSTRACT

Hollow filament wound spar structure is provided adapted for rotational hub mounting under centrifugal and bending loads. The structure comprises an integrally wound, filament and resin composite spar of a predetermined wall thickness, a fitting integrally wound therein, the fitting defining rotational hub fastening means and comprising a plug having a mechanical engagement groove circumferentially of its longitudinal axis into which the opposing spar wall portion is deflected responsive to winding fabrication of the spar wall on the fitting. Belt means additionally are provided opposite the groove locally peripherally confining the deflected spar wall portion in mechanical engagement reinforcing relation, against relative dislodgement of the spar wall portion from the plug groove in the mounted condition of the spar structure, under centrifugal and bending loads.

26 Claims, 4 Drawing Figures

COMPOSITE SPAR STRUCTURE HAVING INTEGRAL FITTING FOR ROTATIONAL HUB MOUNTING

BACKGROUND OF THE INVENTION

This invention has to do with spar structures and more particularly with spar structures adapted for use as air foils, e.g. as in wind turbines, cooling tower fans, rotor blades, and like devices intended to be mounted from one end in wind force exposed situations. The invention is specifically concerned with spar structures incorporating an integral fitting adapted for mounting composite spar structures on mountings such as rotational hubs, e.g. those used in wind turbines, fans and rotors on a low-cost, efficient and effective basis. The ensuing description will proceed with particular reference to wind turbines as an illustrative context for the invention spar structure.

The modern quest for low-cost, non-polluting energy sources has prompted a review of the oldest, as well as the newest devices for producing energy. Second perhaps only to the use of flowing water, which is presently highly developed in hydroelectric plants, wind motion has intrigued man as an energy source which is nearly ideal in terms of freedom from pollution and which is tantalizingly potentially low in cost. Modern review of known wind turbine technologies has identified a number of areas which can be optimized in wind turbine design for the purpose of making truly competitive, in certain geographic locations, wind turbine energy generation. Among such areas are energy storage systems for occasions when wind availability does not match energy demand, and maximazation of energy production during wind periods through increased efficiencies in the wind turbine generation process itself, and through engineering of wind turbines to be adapted to effectively capture wind energy without destructive response to unusually high wind conditions, such as periodically sweep most geographic locations where wind turbines appear feasible as energy sources.

The present invention focuses on improvements in spar blade structure engineering. While metal and wooden blades have been proposed for wind turbines, the optimum blade would appear to be incorporative a filament and resin composite spar and air foil blade defining afterbody which promises the weathering characteristics, the strength to weight ratio, and the ease of fabrication in many different configurations and sizes, which will make it the structure of choice for future wind turbine design.

Filament and resin composite spars, however, are in need of design improvements at the point of attachment of the spar to the hub of the wind turbine. Such hubs, typically, comprise a shaft having two radially disposed members onto which the spar based blades are attached. Blades may range in size from fifty to two hundred or more feet in length, depending on the other characteristics of the wind energy generator, and accordingly, the blades are subjected to tremendous centrifugal and bending loads as they rotatively respond to ambient winds. The spar attaching structure should provide for rotation of the spar and afterbody blades on their own longitudinal axis for purposed of changing the blade pitch, whereby efficiency of the wind turbine may be improved.

PRIOR ART

It has been proposed to secure composite spar structures to rotational hubs by bolting the spar inner terminus to a mounting ring carried by the hub, the bolts passing radially through the spar inner terminus. This necessitates an extensive circular series of bolts, and thus bolt holes drilled through the difficultly drillable spar walls; this operation being highly disadvantageous to the integrity of the spar wall (which integrity is one of the chief advantages of a filament wound composite spar structure in the first place), and is labor intensive, in contrast to the balance of the composite spar structure fabrication operation.

SUMMARY OF THE INVENTION

It is accordingly a major objective of the present invention to bring to composite spar wind turbine blade structure technology, means of fitting a spar structure to a rotational hub which is consistent with and carries through the numerous technological and structural advantages of filament winding of such structures. It is a further object of the invention to provide a composite spar structure having an integrally wound fitting which is adapted to mount the spar to a rotational hub, the fitting having means enhancing the mechanical engagement of the spar wall to the fitting against dislodgement under centrifugal and bending loads to maintain the integrity of the spar structure dispite differences in the tensile modulus of the fitting per se, and the surrounding spar wall structure. It is a further object of the invention to provide a low-cost spar blade structure which is readily mounted on conventional wind turbine hub systems. And a still further object of the invention is to provide a low-cost means of fabricating the spar structure to be readily mounted on wind turbine rotational hub structures. In accordance with the foregoing objectives, and other objectives of the invention to be become apparent hereinafter, the invention provides a hollow, filament wound spar structure adapted for rotational hub mounting under centrifugal and bending loads, the structure comprising an integrally wound, filament and resin composite spar of a predetermined wall thickness, a fitting integrally wound therein, the fitting defining rotational hub fastening means and comprising a plug having a mechanical engagement groove circumferentially of its longitudinal axis into which the opposing spar wall portion is deflected responsive to winding fabrication of the spar wall on the fitting, and belt means opposite the groove locally peripherally confining the deflected spar wall portion in mechanical engagement reinforcing relation against relative dislodgement of the spar wall portion from the plug groove in the mounted condition of the spar structure under centrifugal and bending loads. The spar structure may further include an adhesive bonding agent bonding the plug to the spar wall. The plug typically defines a surface of revolution and may be circular in transverse cross-section and comprise metal having a higher tensile modulus than the spar wall.

Features of the invention include having a belt means comprised of resin bonded inorganic fibers wound parallel to the plane of the groove; the spar being wound with predominantly longitudinally disposed elements; the groove being flat-bottomed and slope-sided; and the plug being annular.

In preferred embodiments, the spar per se has a D-shaped cross-section and the structure further includes a glass filament and resin composite over wound afterbody cooperating with said spar in air foil shaped blade defining relation. Further included is a second circumferential groove spaced axially from the first groove in second spar wall portion receiving relation; the belt means extending across the first and second grooves, a second belt means axially spaced from the first belt means and opposite the second groove in second spar wall portion peripherally confining relation; the first and second belt means each comprising resin bonded inorganic filaments would parallel to the plane of their respective grooves about the spar wall in wall thickness compressing relation; the belt means being congruent with their respective grooves; the belt means being of equal volume with their respective grooves, the spar wall portion deflections into the grooves defining a peripheral recess, with the belt means complementing the recesses in predetermined spar wall thickness maintaining relation. Additional grooves may be employed in like manner.

In more particularly preferred embodiments, the first belt means defines a torus of a first diameter coplanar and coaxial with and radially beyond the first groove, and the second belt means defines a torus of a second, lesser diameter coplanar and coaxial with and radially beyond the second groove, the first belt means torus having an axially continued cylindrical extent encircling the second belt means torus in confining relation, the second belt means typically then, being laminated between inner and outer layers of the spar wall opposite the second groove.

As in other embodiments, the just mentioned embodiment may employ an adhesive bonding agent bonding the plug to the spar wall, the plug may comprise metal having a higher tensile modulus than a spar wall and the plug may be generally conical and have an annular base projecting beyond the inner terminus of the spar in wound filament-space and resin-free relation, the base carrying circularly distributed said rotational hub fastening means, comprising threaded fastener engagement structure; and the belt means comprising resin bonded glass fibers wound parallel to the groove thereopposite.

Preferably the spar is wound with a predominantly longitudinally disposed filament and the grooves are each flat-bottomed and outwardly slope-sided, the belt torus thereopposite having a congruent shape sufficient in volume to complement the deflected wall portion defined perimetrical recess in the spar wall portion. Also, there may be provided separate fastening means radially penetrating the plug and the spar wall, in plug and spar wall relative lateral and rotational movement restraining relation, particularly against applied shear stress conditions.

In summary form, the invention contemplates a hollow, longitudinally extended, blade-shaped spar structure adapted for mounting on a wind turbine rotational hub for wind responsive movement under centrifugal and bending loads, the structure comprising integrally wound predominantly longitudinally disposed glass filament and thermosetting resin composite cross-sectionally D-shaped spar of a predetermined wall thickness pattern, and having a circular inner terminus, and integral therewith a glass filament and resin composite afterbody defining with said spar a blade shape; a high tensile modulus metal fitting integrally wound into the spar inner terminus, the fitting defining female threaded fastener engagement structure adapted to mount the spar to the rotational hub and comprising a generally conical plug having an annular inner terminus defining the locus of the circular inner terminus of the spar; the plug having first and second, diametrically larger and smaller respectively, outwardly opening mechanical engagement grooves circumferentially thereof in axially spaced planes normal to the plug longitudinal axis into which the opposing spar wall portion is locally deflected responsive to winding fabrication of the spar wall on the fitting, and exclusively transversely wound first and second glass filament toroidal belts respectively opposite the first and second grooves in radially spaced congruent relation, said toroidal belts being tensionally wrapped about said spar wall to peripherially compress and confine a respective opposite wall portion locally deflected into said grooves in mechanical engagement reinforcing relation against relative dislodgement of the spar wall portion from the plug grooves in the fitting mounted condition of the spar structure, under centrifugal and bending loads induced by wind or the like.

BRIEF DESCRIPTION OF THE DRAWINGS

The invention will be further described as to an illustrative embodiment in conjunction with the attached drawings in which.

DESCRIPTION OF THE PREFERRED EMBODIMENTS

Figure 1:
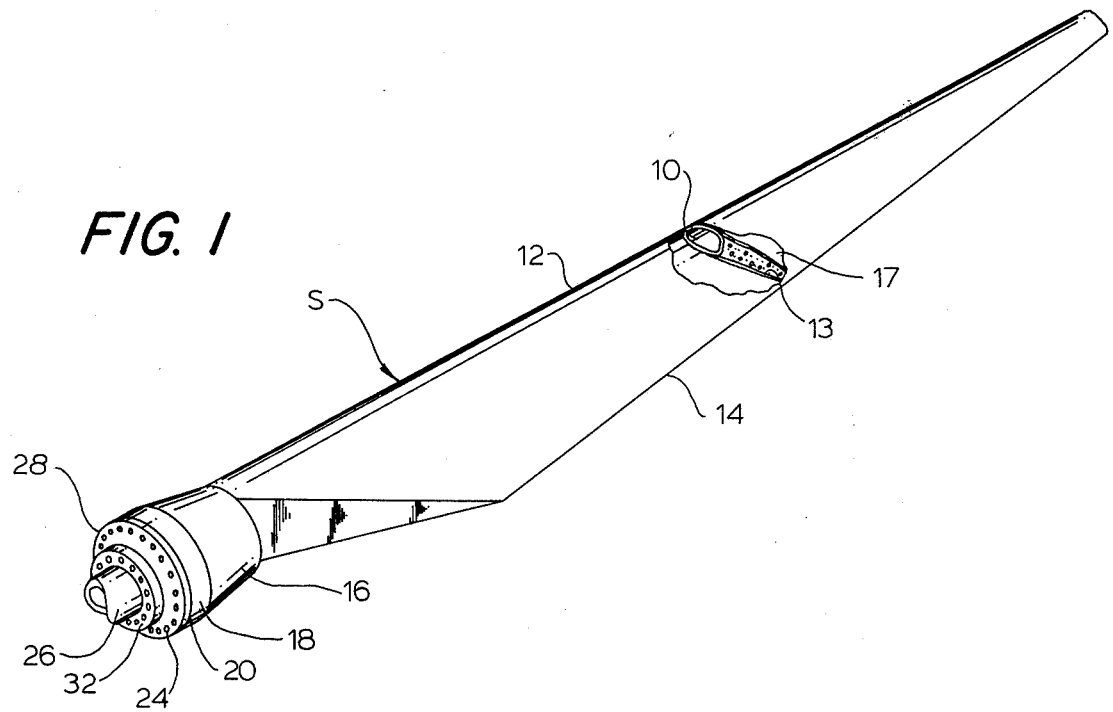
FIG. 1 is a perspective view of the spar and afterbody structure with integral fitting according to the present invention.
Figure 2:
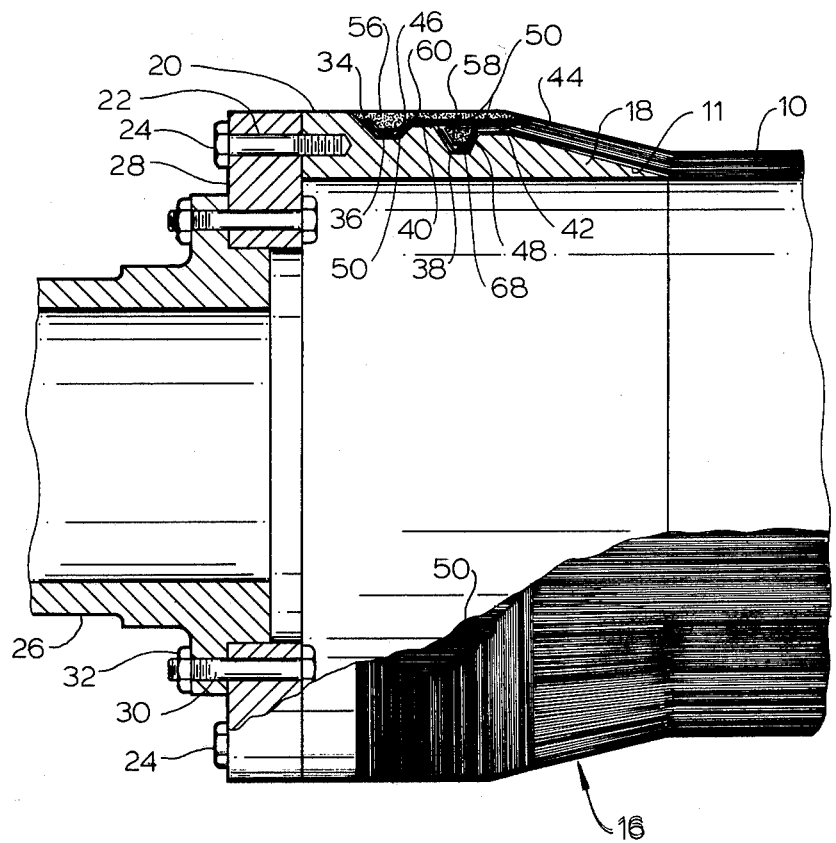
FIG. 2 is a view in vertical section of the spar structure inner terminus and integrally wound fitting, secured to a rotational hub mounting.

With reference now to the drawings in detail, in FIGS. 1 and 2 spar structure S according to the invention is seen to be blade shaped and comprise the cross-sectionally D-shaped spar proper 10 defining a rounded leading edge 12, and an afterbody 13 of pre-shaped plastic, e.g. polyurethane foam partially cored out if desired and overwound with glass filament and resin to define a sharply tapered trailing edge 14. The spar 10 has a thickened inner terminus defining spar root portion 16. Fitting 18 according to the invention is integrally wound into the spar root portion which terminates in a circular aperture as shown in FIG. 2.

The shapes of the spar 10 and afterbody 13 shown in FIG. 2 are typical, but not limitative of the invention. Similarly, the fitting 18 is advantageously annular in shape as shown and formed of metal of higher tensile modulus than the resin-glass composite which forms the spar 10, but may be of other shapes and materials.

The fitting 18 has an annular base 20 in which bolt fastening structure is formed by an annular series of tapped holes 22, which receive a series of bolts 24. Alternately, bolts could be sunk in the fitting 18 and project outward to receive securing nuts. The fitting 18 is secured to the rotatable hub section 26 (secured to a wind turbine shaft, not shown) through the use of adapter ring 28 to accommodate diametrical differences in the hub section and fitting. Adapter ring 28 is bolted to the fitting 18 by bolts 24 and the hub section 26 is in turn bolted to the adapter ring 28 by a second series of bolts 30 having nuts 32.

Thus far described, it will be readily observed that the spar structure affords a considerable ease of attachment to existing hub design, of which section 26 is typical.

The integrity of the connection between the spar 10 and fitting 18 is of utmost importance. To fully understand this connection, which is a signal feature of the invention, it is necessary to briefly review the process of fabricating filament and resin composites.

In general, and to the extent applicable here, such composites which are to have a relatively extended longitudinal axis are formed by winding filaments circularly about a removable mandrel, with e.g., thermosetting, resin which bonds the filaments to one another. In fabricating the spar 10 specifically, it is preferred to wind the filament in preassembled webs of mostly transverse (woof) filament sections, held together by relatively few longitudinal (warp) filaments and at an angles of wind such that the transverse filament sections lie at or near 90° to the circumferential planes of the spar, i.e. nearly parallel to the longitudinal axial plane of the spar. Succeeding web layers, e.g. an overlap of 50% can be used from web turn to web turn, provide the spar 10 with over 90% of its filament content longitudinally disposed, for maximum strength in the expected stress direction, from bending and centrifugal loading in wind responsive use. Afterbody 13 is positioned and additional filament 17 and resin wound over both spar 10 and the afterbody to provide the air foil-like shape shown for structure-S.

Figure 3:
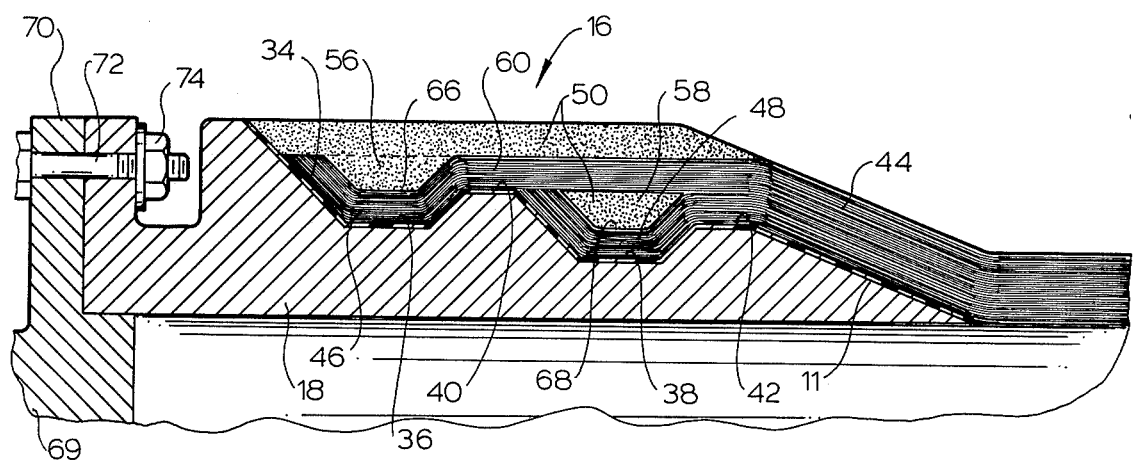
FIG. 3 is a vertical section view, greatly enlarged, of a portion of the inner terminus of the spar structure and an alternate form of wound fitting with a variational hub mounting.
Figure 4:
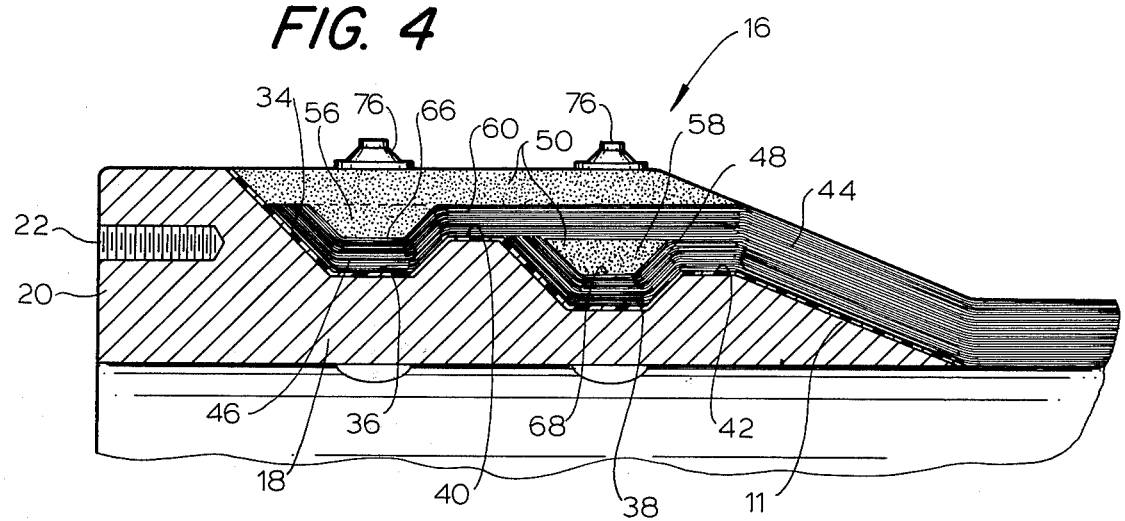
FIG. 4 is a view generally like FIG. 3, showing the FIG. 2 form of the invention with added fastening means.

This use of web winding of filament provides considerable advantage at the root portion 16 of the spar 10, in that the filament-web may be butted at the root to annular base shoulder 34 of the fitting 18, without need of endwise wrapping of the fitting. See. FIGS. 2, 3 and 4.

Proceeding now to the integral winding of the fitting 18 and spar 10, the winding of filament, being effected by relative rotational movement between the spar 10 carried on a mandrel, and the filament supply, results in overwinding the fitting 18 when the filament is wound at the inner terminus of the spar, by simply positioning the fitting to act as a mandrel at that area of the spar. Such overwinding of integral fittings is well-known in the art and need not be further described here.

There are, however, special winding steps taken in the fabrication of the present spar structure S which will now be described. Initially, it is to be noted that the fitting 18 is generally conical and annular, and defines between its upper and lower (right and left in the Figures) ends two circumferential grooves 36, 38, the lower (or left) groove 36 being closer to the base 34 and greater in diameter than the upper (or right) groove 38. Both grooves 36, 38 lie in planes normal to the longitudinal axis of the conical fitting 18 and both are flat-bottomed and outwardly slope-sided. Between them grooves 36, 38 define perimetrical rib land 40, and a further land 42 is defined beyond (above) grooves 38, and thereafter the fitting 18 tapers inwardly to a relatively greater degree. Fitting 18 typically a machined body of high strength metal, e.g. steel, is placed for winding the filaments, and is progressively wound integrally with the root portion 16 of the spar 10 as shown.

Because of the grooves 36, 38, the spar wall 44 has portions, e.g. 46, 48 which are deflected in the course of winding into the grooves thereopposite, as best shown in FIG. 2. As a further signal feature of the invention retainer belts 50, comprising suitably a congruent cross section torus 56, 58 to grooves 36, 38 respectively, are provided. Each torus 56, 58 is hoop wound, under tension, to compress the filament windings thereunder for purposes now to be explained.

With reference first to groove 38, the smaller diameter, upper groove, the successive windings of filament are ultimately wound over and deflected into the groove with successive windings thickening the depth of filament and resin in the groove to a predetermined level forming wall portion 48. In this connection, the fitting 18 for a 60-foot long blade may be 35 inches in maximum outside diameter, the groove having a minimum depth of about 1 inch, and a maximum width of 2.5 inches, and there may typically be wound thereinto sufficient filament/resin composite to fill the groove to just below the edges thereof, the fitting having been previously coated with an epoxy or like adhesive bonding agent 11. The result of such overwinding of the groove 38 is the deflection of wall portion 48 and thereby the formation of a peripheral recess 68, overlying the groove and formed by the annular depression in the partly formed spar wall 48 at such groove. The torus 58 is then formed in situ in the peripheral recess 68 by winding, circumferentially, many multiple turns of filaments and resin, filling in recess 68 and creating therein torus 58. The tensioned winding of filaments of torus 58 compresses the previously laid down windings of wall portion 48 in the groove 38 and peripherally confines them, as shown particularly in FIGS. 2, 3 and 4.

The deflection of windings also occurs at larger diameter, lower groove 36, where the wall portion 46 forms a second peripheral recess 66. There the circumferential winding step is also carried out to form torus 56 circumferentially of recess 66 in wound filament compressing and confining relation. The effect of these axially spaced toroidal, tensioned windings, is to reinforce the mechanical engagement of the wound filament wall portions 46, 48 in grooves 36, 38 and to increase the binding between the wall 44 and the rib land 40, particularly because of the circumferential belting of the wall portion 60 between portions 46, 48 at axially spaced locations just on either side of land 40. The torus 56 is congruent with and sized relative to the groove 36 to maintain the nominal wall 44 thickness at that groove as shown in dotted outline.

Winding of the spar 10 fitting 18 connection is completed by overwrapping the root portion 16 of the spar with a cylindrical continued extent of the torus 56 further compressing the final wrap of web wall 44 sections and torus 58 as well.

In FIG. 3 the fitting 18 is bolted directly to a hub section 69 having a suitably sized annular flange 70 with bolts 72 and nuts 74; the adapter ring 28 of FIG. 2 is omitted.

In FIG. 4 the use of Huck bolts 76 is shown, extending through the fitting 18, the spar wall 44 and torus 56, 58 to block relative rotation of the fitting and spar wall and to support the assembly in certain applied shear stress conditions. Also fitting 18 is provided with tapped holes 22 to receive mounting bolts (not shown) from a mounting hub (not shown).

We claim:

1. A hollow, filament wound spar structure adapted for rotational hub mounting under centrifugal and bending loads, said structure comprising an integrally wound, filament and resin composite spar of a predetermined wall thickness, a fitting integrally wound therein, said fitting defining rotational hub fastening means and comprising a plug having mechanical engagement groove and land means circumferentially of the longitudinal axis to the surface contour of which the opposing spar wall portion conforms responsive to winding fabrication of the spar wall on said fitting, and separately formed belt means opposite said groove and land means locally peripherally confining said conformed spar wall portion and the axially adjacent spar wall portion in said groove means and against said plug respectively in mechanical engagement reinforcing relation against relative dislodgement of said spar wall portion in the mounted condition of the spar structure, under centrifugal and bending loads.

2. Spar structure according to claim 1, including also an adhesive bonding agent bonding said plug to said spar wall.

3. Spar structure according to claim 1, in which said plug comprises metal having a higher tensile modulus than said spar wall.

4. Spar structure according to claim 1, in which said plug defines a surface of revolution.

5. Spar structure according to claim 4 in which said plug is annular in transverse cross section.

6. Spar structure according to claim 1, in which said belt means comprises resin bonded inorganic fibers wund parallel to the plane of said groove means.

7. Spar structure according to claim 6, in which said spar is wound with predominantly longitudinally disposed filaments.

8. Spar structure according to claim 7, in which said groove means is flat-bottomed and slope-sided.

9. Spar structure according to claim 1, in which said spar has a D-cross-section and including also a glass filament and resin composite overwound afterbody cooperating with said spar in air foil shaped blade defining relation.

10. Spar structure according to claim 9, in which said plug is annular and in which said groove and land means comprises first and second circumferential grooves relatively spaced axially in respective first and second spar wall portion receiving relation.

11. Spar structure according to claim 10, in which said belt means comprises a first belt means and extends across said land and said first and second grooves.

12. Spar structure according to claim 10, including also a second belt means axially spaced from said first belt means and opposite said second groove in second spar wall portion peripherally confining relation.

13. Spar structure according to claim 12, in which said first and second belt means each comprise resin bonded inorganic filaments wound parallel to the plane of their respective grooves about said spar wall in wall thickness compressing relation.

14. Spar structure according to claim 13, in which said belt means are congruent with their respective grooves.

15. Spar structure according to claim 14, in which said belt means are of equal volume with their respective grooves, said spar wall portion deflections into said groove defining peripheral recesses, said belt means complementing said recesses, in predetermined spar wall thickness maintaining relation.

16. A hollow, filament wound spar structure adapted for rotational hub mounting under centrifugal and bending loads, said structure comprising an integrally wound, filament and resin composite spar of a predetermined wall thickness, a fitting integrally wound therein, said fitting defining rotational hub fastening means and comprising a plug having axially spaced mechanical engagement grooves circumferentially of the longitudinal axis into which the opposing spar wall portion is deflected responsive to winding fabrication of the spar wall on said fitting, and first and second belt means respectively opposite said first and second grooves and locally peripherally confining respective deflected spar wall portions in mechanical engagement reinforcing relation against relative dislodgement of said spar wall from said plug in the mounted condition of the spar structure, under centrifugal and bending loads, said first belt means defining a torus of a first greater diameter coplanar and coaxial with and radially beyond said first groove, and said second belt means defining a torus of a second lesser diameter coplanar and coaxial with with and radially beyond said second groove, said first belt torus having an axially continued extent encircling said second belt means torus in confining relation.

17. Spar structure according to claim 16, in which said second belt means is laminated between inner and outer layers of said spar wall opposite said second groove.

18. Spar structure according to claim 17, including also an adhesive bonding agent bonding said plug to said spar wall.

19. Spar structure according to claim 18, in which said plug comprises metal having a higher tensile modulus than said spar wall.

20. Spar structure according to claim 19, in which said plug is generally conical.

21. Spar structure according to claim 20 in which said conical plug has an annular base projecting beyond the inner terminus of said spar in wound filament and resin free relation, said base carrying circularly distributed rotational hub fastening means comprising threaded fastener engagement structure.

22. Spar structure according to claim 20, in which said belt means comprises resin bonded glass fibers wound parallel to said groove thereopposite.

23. Spar structure according to claim 22, in which said spar is wound with predominantly longitudinally disposed filaments.

24. Spar structure according to claim 21 in which said groove is flat-bottomed and outwardly slope-sided, said belt torus thereopposite having a congruent shape and a volume sufficient to complement the deflected wall portion defined perimetrical recess in said spar wall portion.

25. Spar structure according to claim 24 including also separate fastening means radially penetrating said plug and said spar wall in plug and spar wall relative lateral and rotational movement restraining relation.

26. A hollow, longitudinally extended blade-shaped spar structure adapted for mounting on a wind turbine rotational hub for wind responsive movement under centriugal and bending loads, said structure comprising an integrally wound predominantly longitudinally disposed glass filament and thermosetting resin composite cross-sectionally D-shaped spar of a predetermined wall thickness pattern and having a circular inner terminus, and integral therewith a glass and resin afterbody defining with said spar a blade shape; a high tensile modulus metal fitting defining female threaded fastener engagement structure adapted to mount said spar to said rotational hub and comprising a generally conical plug having an annular inner terminus defining the locus of said circular inner terminus of said spar; said plug having a circumferential land and first and second diametrically larger and smaller respectively outwardly opening mechanical engagement grooves in axially spaced planes normal to the plug longitudinal axis on opposite sides of said land and into which the opposing spar wall portion is locally deflected responsive to winding fabrication of the spar wall on said fitting, and exclusively transversely wound first and second glass filament torodial belts respectively opposite said land and said first and second grooves in radially spaced and congruent relation, said toroidal belts being tensionally wrapped about said spar wall to peripherally compress and confine the respective opposite wall portions locally deflected into said grooves and to relatively increase the binding of the wall portions between said groove-deflected portions against said land in mechanical engagement reinforcing relation against relative dislodgement of the spar wall portion from said plug grooves in the fitting mounted condition of the spar structure, under centrifugal and bending loads induced by wind or the like.

* * * * *